United States Patent
Nguyen

(10) Patent No.: US 8,737,249 B2
(45) Date of Patent: May 27, 2014

(54) HARQ INDICATOR DETERMINATION

(75) Inventor: Quang Nguyen, Mulgrave (AU)

(73) Assignee: NEC Corporation, Tokyo (JP)

( * ) Notice: Subject to any disclaimer, the term of this patent is extended or adjusted under 35 U.S.C. 154(b) by 413 days.

(21) Appl. No.: 13/260,493

(22) PCT Filed: Mar. 25, 2010

(86) PCT No.: PCT/JP2010/056038
§ 371 (c)(1),
(2), (4) Date: Sep. 26, 2011

(87) PCT Pub. No.: WO2010/110494
PCT Pub. Date: Sep. 30, 2010

(65) Prior Publication Data
US 2012/0020241 A1    Jan. 26, 2012

(30) Foreign Application Priority Data
Mar. 27, 2009  (AU) ................ 2009901338

(51) Int. Cl.
*G06F 11/00* (2006.01)
*H04L 1/16* (2006.01)
*H04L 1/18* (2006.01)

(52) U.S. Cl.
CPC ............. *H04L 1/1607* (2013.01); *H04L 1/16* (2013.01); *H04L 1/18* (2013.01)
USPC ...................................................... 370/252

(58) Field of Classification Search
CPC .......... H04L 1/16; H04L 1/18; H04L 1/10607
USPC ......... 370/229, 235, 241, 252, 310, 328, 351, 370/389, 395.1, 395.5, 395.52; 455/403, 455/422.1, 423
See application file for complete search history.

(56) References Cited

U.S. PATENT DOCUMENTS

| | | | |
|---|---|---|---|
| 2004/0233976 A1 | 11/2004 | Han et al. | |
| 2004/0246917 A1* | 12/2004 | Cheng et al. | 370/328 |
| 2009/0036155 A1* | 2/2009 | Wu et al. | 455/522 |
| 2009/0228753 A1* | 9/2009 | Pan et al. | 714/748 |

FOREIGN PATENT DOCUMENTS

| | | |
|---|---|---|
| CN | 1585397 A | 2/2005 |
| CN | 101141145 A | 3/2008 |
| CN | 101388758 A | 3/2009 |
| JP | 2005-506753 A | 3/2005 |
| JP | 2007-325314 A | 12/2007 |
| WO | 2006/011205 A1 | 2/2006 |

OTHER PUBLICATIONS

Office Action dated Aug. 2, 2013 issued by the State Intellectual Property Office of the People's Republic of China in counterpart Chinese Application No. 201080014094.8.

(Continued)

*Primary Examiner* — Obaidul Huq
(74) *Attorney, Agent, or Firm* — Sughrue Mion, PLLC

(57) ABSTRACT

In order to determine whether a hybrid automatic repeat request (HARQ) indicator received by user equipment (UE) from a base station is an acknowledgment (ACK) or negative acknowledgement (NACK), when a signal representing the HARQ indicator is received by the UE, a plurality of symbols encoded in the received signal are determined to obtain a softbit for each of the symbols by summing an in-phase component and a quadrature component of each symbol. Thereafter, the softbits are summed up to be compared with the amplitude of the symbols to determine whether the HARQ indicator is an ACK or NACK.

10 Claims, 3 Drawing Sheets

(56) References Cited

OTHER PUBLICATIONS

3GPP TSG RAN WG1 meeting#45, Tdoc:R1-061142, "Solution to mitigate the ACK/NACK misinterpretation," SHRCWC, RITT, May 2006, pp. 5 pages total.

3GPP TSG RAN WG1 #49bis, R1-073015, "ACK/NACK modulation with UL data," Nokia Siemens Networks, Nokia, Jun. 2007, 4 pages total.

TSG-RAN Working Group 1 #21, R1-01-0744, "ACK/NACK Control Channel Reliability for High Speed Downlink Packet Access (HSDPA)," Motorola, Jun. 2001, 2 pages total.

* cited by examiner

HARQ INDICATOR DETERMINATION

CROSS REFERENCE TO RELATED APPLICATIONS

This application is a National Stage of International Application No. PCT/JP2010/056038 filed Mar. 25, 2010, claiming priority based on Australian Patent Application No. 2009-901338 filed Mar. 27, 2009, the contents of all of which are incorporated herein by reference in their entirety.

TECHNICAL FIELD

The present invention is related to methods and apparatus for determining whether a hybrid automatic repeat request (HARQ) indicator received by user equipment (UE) from a base station is an acknowledgement (ACK) or negative acknowledgement (NACK).

BACKGROUND ART

A HARQ indicator is used in mobile communications to indicate a packet acknowledgment status (ACK or NACK) based on the reception and decoding of a corresponding packet. An ACK informs the transmitting end (UE or base station) that a retransmission is unnecessary, and a NACK indicates that retransmission is necessary. This improves the integrity of the transmitted data by ensuring that missing or corrupted packets are resent.

Typically, when a HARQ indicator is received by a UE, a determination is made whether the HARQ indicator is an ACK or a NACK based on the sum of the in-phase and the quadrature components of the received signal. If the sum is above a detection threshold, the HARQ indicator is an NACK, if the sum is below the detection threshold, the HARQ indicator is a ACK.

There are two situations in which an error may occur in detecting whether the HARQ indicator is an ACK or a NACK—an ACK may be incorrectly recognised as a NACK or a NACK may be incorrectly recognised as an ACK. The first case results in unnecessary retransmission, wasting a small amount of radio resources. However, the second case is more serious, resulting in loss of the packet, as it is not retransmitted. The $3^{rd}$-Generation Partnership Project (3GPP) sets targets of error detection rate for ACK→NACK and for NACK→ACK of P(ACK→NACK)=0.1% and P(NACK→ACK)=1%.

These targets may be difficult to achieve when there is a change in power level on the HARQ channel. The power level may change because of a change in distance between the base station and UE, switching to a different base station or disturbances on the path between the base station and UE.

This change in power level results in a change in the detection threshold used to determine whether a HARQ indicator is an ACK or NACK. The UE is not informed of these changes, and therefore may incorrectly decode a HARQ indicator.

It would be desirable to provide a method of determining whether a HARQ indicator is an ACK or a NACK, which is independent of the power level of the HARQ channel.

DISCLOSURE OF THE INVENTION

According to one aspect, the present invention provides a method for determining whether a hybrid automatic repeat request (HARQ) indicator received by user equipment (UE) from a base station is an acknowledgment (ACK) or negative acknowledgement (NACK), the method including the steps of:

receiving a signal representing the HARQ indicator transmitted from the base station to the UE, determining the amplitude of a plurality of symbols encoded in the received signal, determining a softbit for each of these symbols, each softbit being the sum of an in phase and quadrature component of the symbol, summing the softbits, and comparing the amplitude of the symbols to the sum of the softbits in order to determine whether the HARQ indicator is an ACK or NACK.

The method does not require prior knowledge of the power level of the HARQ channel. It therefore provides a more reliable method of determining whether the HARQ indicator is an ACK or NACK, as fluctuations in power level do not affect the determination. This may enable the 3GPP targets to be met.

The signal representing the HARQ indicator may comprise any number of symbols. The plurality of symbols whose amplitudes are determined and softbits summed may be a subset of the total symbols received, and need not be consecutive symbols.

The amplitude of the plurality of symbols may be calculated according to the formula:

$$Amp = \sum_{i=0}^{N-1}(\sqrt{I_i^2 + Q_i^2})$$

or it may be approximately calculated according the formula:

$$Amp = \sum_{i=0}^{N-1}[\max(|I_i|, |Q_i|) + 0.5 \min(|I_i|, |Q_i|)]$$

where

Amp is the amplitude

N is the number of symbols

I is the in phase component of the de-scrambled signal

Q is the quadrature component of the de-scrambled signal

The amplitude of the symbols may be multiplied by a fixed threshold before being compared to the sum of the softbits. This threshold may be determined by simulations. For example, the simulations may determine the threshold required to achieve P(ACK→NACK)≤0.1% and P(NACK→ACK)≤1% with a signal to noise ratio (SNR) below a predetermined SNR.

An ACK may be indicated by the sum of the softbits being less than the amplitude of the symbols multiplied by a fixed threshold and a NACK indicated by the sum of the softbits being equal to or greater than the amplitude of the symbols multiplied by a fixed threshold.

The signal may be transmitted on the physical hybrid automatic repeat request indicator channel (PHICH) of the Long Term Evolution (LTE) mobile communication system, or any other channels on which HARQ indicators are sent to the UE.

Embodiments of the present invention will now be described, by way of example only, with reference to the accompanying drawings. It is to be understood that the particularity of the drawings does not supersede the generality of the preceding description of the invention.

BEST MODE FOR CARRYING OUT OF THE INVENTION

Figure 1:
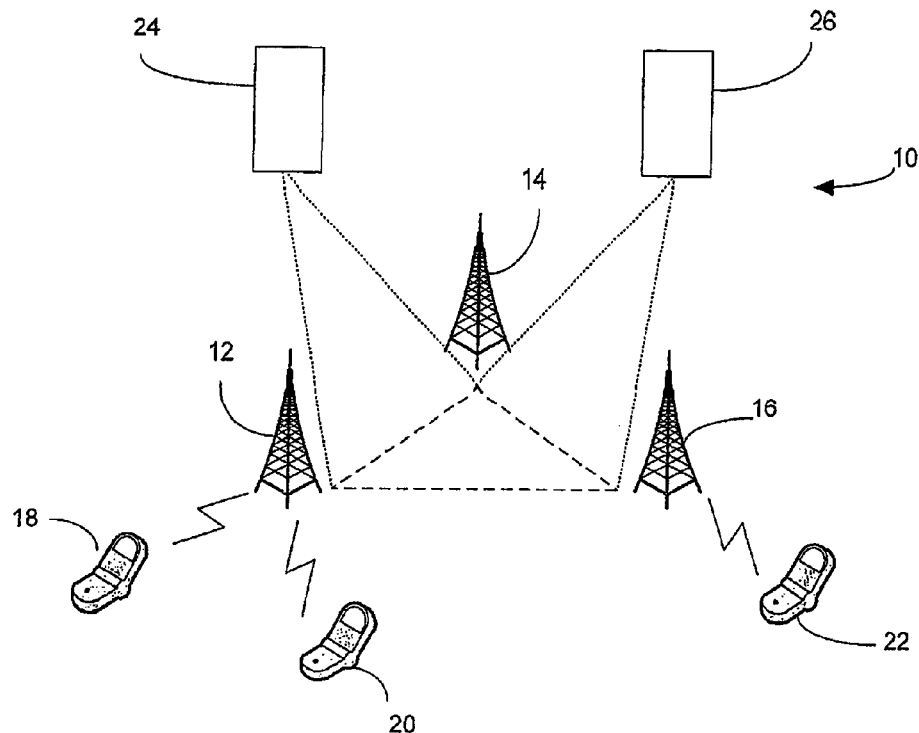
FIG. 1 is a diagram illustrating a configuration of an LTE mobile communication system.

FIG. 1 shows the configuration of a Long Term Evolution (LTE) mobile communication system 10. LTE is a mobile network technology standard based on a 3GPP standard. It is expected to increase data rates for mobile wireless users, improve user throughput and make more efficient use of the radio frequency spectrum.

In the LTE system 10, base stations 12, 14 and 16, also known as evolved Node Bs (eNode B), support communication for multiple UEs 18, 20 and 22, for example mobile phones, laptops, personal digital assistants. The base stations 12, 14 and 16 are fixed and each provide communication coverage for a particular geographical area. Mobile management entities 24 and 26 couple to the base stations 12, 14 and 16 and provide coordination and control of the base stations 12, 14 and 16.

In the downlink channel, from the base stations 12, 14 and 16 to the UEs 18, 20 and 22, the LTE standard uses Orthogonal Frequency Division Multiplexing (OFDM). OFDM is a digital multi-carrier modulation method that uses a large number of closely spaced orthogonal sub-carriers to carry data.

Each sub-carrier has two carrier signals (an in phase signal I and a quadrature signal Q) that are 90° out of phase with each other and are separately modulated, for example using quadrature amplitude modulation (QAM).

Under the LTE protocol, to ensure the integrity of packets of data sent on the uplink transmission from, for example, UE 18 to base station 12, the packets include error-detection information to enable the base station 12 to detect incorrect transmissions. The packets also include forward error correction bits to enable the base station 12 to correct a packet if it is not too badly corrupted. Retransmitted packets that are themselves incorrect can be combined with previous incorrect packets to obtain the correct packet.

After receiving a packet on the uplink, the base station 12 sends a HARQ indicator to the UE 18 on the physical hybrid automatic repeat request indicator channel (PHICH) to indicate whether or not the transmission of the packet was successful (ACK or NACK), and retransmission required. For a positive acknowledgement, the HARQ indicator=1, for a negative acknowledgement, the HARQ indicator=0. Typically, three symbols are encoded in the signal representing the HARQ indicator.

Figure 2:
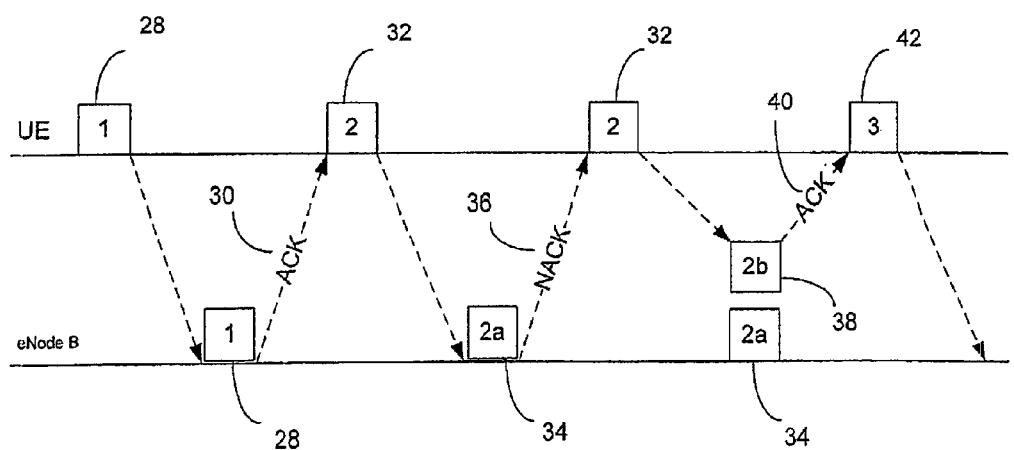
FIG. 2 is a diagram showing a HARQ process.

An example of this process is described with reference to FIG. 2. In FIG. 2, a packet 28 is transmitted from the UE 18 to the base station 12, and is successfully received by the base station 12. The base station 12 transmits an ACK 30 to the UE 18 to confirm successful receipt of the packet. This prompts the UE 18 to transmit the next packet 32 in the sequence. In this case, the next packet 32 is not correctly transmitted, and the base station 12 instead receives a corrupted packet 34. The base station 12 determines that the packet 34 is incorrect and transmits a NACK 36 to the UE 18. The UE 18 then retransmits packet 32 to the base station 12. Another corrupted packet 38 is received by the base station 12, however, in this case the base station 12 is able to reconstruct packet 32 from received packets 34 and 38. Therefore, the base station 12 sends an ACK 40 to the UE 18. On receipt of the ACK 40, the UE 18 transmits the next packet 42 to the base station 12.

To indicate an ACK, the base station 12 transmits negative-value symbols to the UE 18 on the PHICH. To indicate a NACK, the base station 12 transmits positive-value symbols to the UE 18 on the PHICH. After channel coding and modulation $-1/\sqrt{2}-j1/\sqrt{2}$, is submitted to indicate an ACK and $1/\sqrt{2}+j1/\sqrt{2}$ to indicate a NACK.

Figure 3:
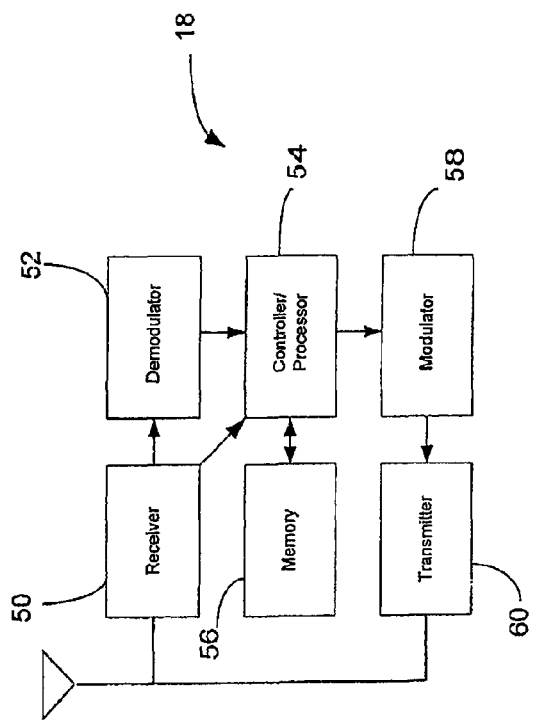
FIG. 3 is a block diagram illustrating components of a UE.

The component parts of a UE 18 are illustrated in FIG. 3. The UE 18 has a receiver 50 for receiving, despreading and descrambling signals transmitted from the base station 12, and a demodulator 52 for demodulating the despreaded, descrambled signals. A controller/processor 54 interprets the demodulated signal and performs any necessary processing steps. Data required by the controller/processor 54 is stored in a memory 56. The UE 18 also includes a modulator 58 to modulate a signal to be sent to the base station 12, and a transmitter 60 to scramble, spread and transmit the signal on the uplink.

Figure 4:
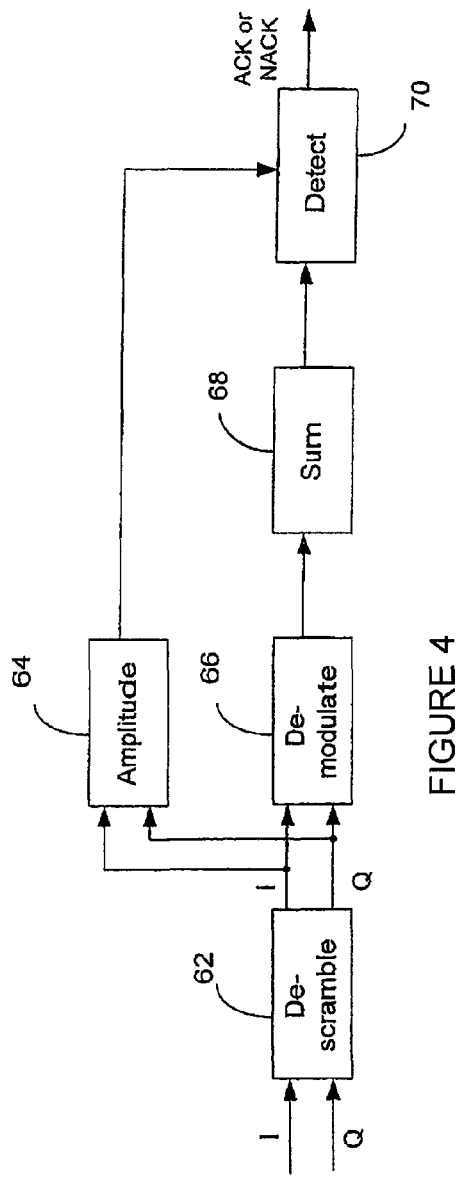
FIG. 4 is a block diagram illustrating a method in accordance with an embodiment of the present invention.

In accordance with an embodiment of the invention, and as illustrated in FIG. 4, a method for determining whether a HARQ indicator transmitted from the base station 12 to the UE 18 is an ACK or NACK takes place in UE 18.

The receiver 50 receives a signal representing the HARQ indicator transmitted from the base station 12. As described above, the signal has in phase I and quadrature Q components. The receiver 50 despreads and descrambles the signal at step 62 to recover the symbols encoded in the signal. The symbols have I and Q components and are of the format (I+jQ), for example, the symbols may be:

(−1.2+j3.4)
(−0.5−j2.1) and
(1.4+j2.6).

The controller/processor 54 then determines the amplitude of the symbols at step 64. The amplitude can be calculating using the formula $$Amp = \sum_{i=0}^{N-1} \left( \sqrt{I_i^2 + Q_i^2} \right)$$

where
Amp is the amplitude
N is the number of symbols
I is the in phase component of the de-scrambled signal and
Q is the quadrature component of the de-scrambled signal.

For the example given above, the amplitude would therefore be 8.72.

$$Amp = \sqrt{(-1.2)^2+(3.4)^2}+\sqrt{(-0.5)^2+(-2.1)^2}+\sqrt{(1.4)^2+(2.6)^2}$$

Amp=3.61+2.16+2.95=8.72

To simplify the calculation, the amplitude can also be calculated approximately using the formula:

$$Amp = \sum_{i=0}^{N-1} [\max(|I_i|, |Q_i|) + 0.5 \ \min(|I_i|, |Q_i|)]$$

where
Amp is the amplitude
N is the number of symbols
I is the in phase component of the de-scrambled signal and
Q is the quadrature component of the de-scrambled signal.

For the example given above, the approximate amplitude would therefore be 9.65.

$$Amp = \max(|-1.2|, |3.4|) + 0.5 \min(|-1.2|, |3.4|) +$$
$$\max(|-0.5|, |-2.1|) + 0.5 \min(|-0.5|, |-2.1|) +$$
$$\max(|1.4|, |2.6|) + 0.5 \min(|1.4|, |2.6|)$$

$$Amp = (3.4 + 0.5 \times 1.2) + (2.1 + 0.5 \times 0.5) + (2.6 + 0.5 \times 1.4) = 9.65$$

The demodulator 52 demodulates the signal at step 66 to determine softbits of the symbols and then the controller/processor 54 sums the softbits at step 68, using the formula:

$$Sum = \sum_{i=0}^{N-1} Softbit(i)$$

Where
Sum is the sum of softbits.
N is number of softbits
Softbit(i) is softbit for the $i^{th}$ symbol.
Each softbit is the sum of the I and Q component of its corresponding symbol.
For the example given above, the softbits output from the demodulator 52 for each symbol are:

softbit(1)=−1.2+3.4=2.2 softbit(2)=−0.5−2.1=−2.6 softbit(3)=1.4+2.6=4.0

Therefore, the sum of the softbits is 3.6.

Sum=2.2−2.6+4.0=3.6

At step 70, the sum of the softbits is compared with the amplitude of the symbols in order to determine whether the HARQ indicator is an ACK or NACK.

The amplitude of the symbols is multiplied by a fixed threshold before being compared to the sum of the softbits. An ACK is indicated by the sum of the softbits being less than the amplitude of the symbols multiplied by a fixed threshold and a NACK is indicated by the sum of the softbits being equal to or greater than the amplitude of the symbols multiplied by a fixed threshold.
This is represented by the following algorithm:
if (Sum<Amp×Threshold) then
HARQ indicator=ACK
else
HARQ indicator=NACK
end In other communication systems, a positive acknowledgement may be indicated by HARQ indicator=0, and a negative acknowledgement by HARQ indicator=1. In these systems, the algorithm may be modified as follows:
if (Sum<Amp×Threshold) then
HARQ indicator=NACK
else
HARQ indicator=ACK
end The fixed threshold should be larger than zero and its optimal value is determined by simulations. For example, simulations can be run in two stages to determine an optimal fixed threshold that achieves firstly, the requirement of P(ACK→NACK)≤0.1% with SNR≤SNR1, and secondly, the requirement of P(NACK→ACK)≤1% with SNR≤SNR2.

Figure 5:
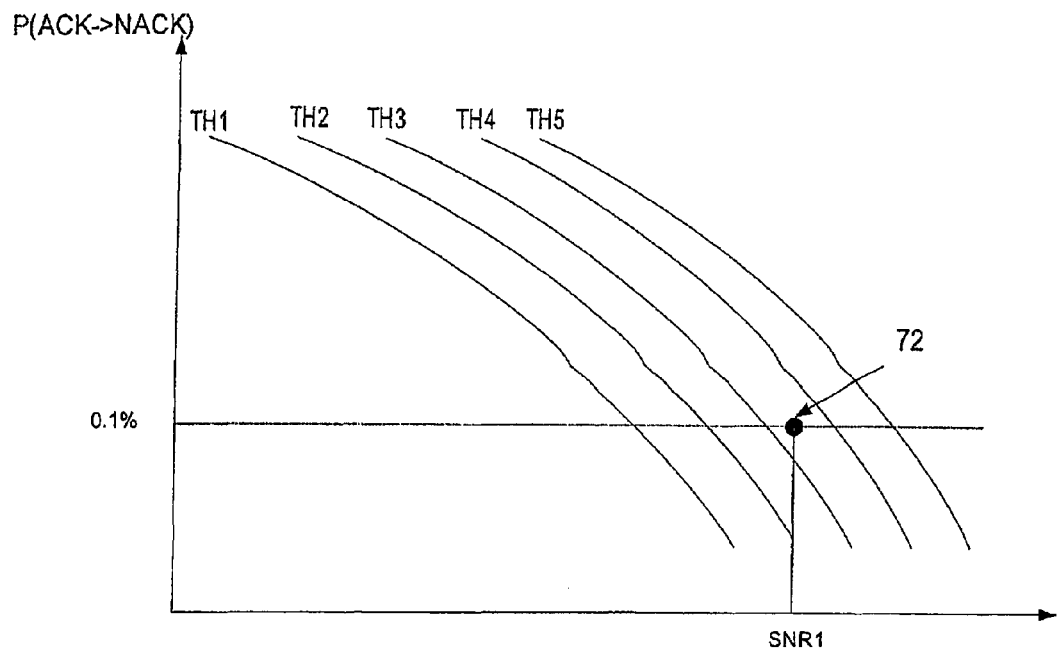
FIG. 5 is a graph of P(ACK→NACK) vs SNR for different fixed thresholds.

In the first stage, the base station 12 continuously sends an ACK to the UE 18 at a SNR having values around SNR1 and under channel conditions specified in the 3GPP specifications. The simulations run using five different sample fixed thresholds TH1, TH2, TH3, TH4 and TH5 (e.g. 0.1, 0.15, 0.2, 0.25, 0.3) and the SNR and P(ACK→NACK) are graphed as shown in FIG. 5. These five thresholds are chosen so that a requirement point 72 lies between the P(ACK→NACK) curves of some of the thresholds.

It can be seen in FIG. 5 that TH1, TH2 and TH3 meet the requirements (P(ACK→NACK)≤0.1% with SNR≤SNR1) and TH4 and TH5 do not. TH1, TH2 and TH3 are therefore selected for the second stage.

Figure 6:
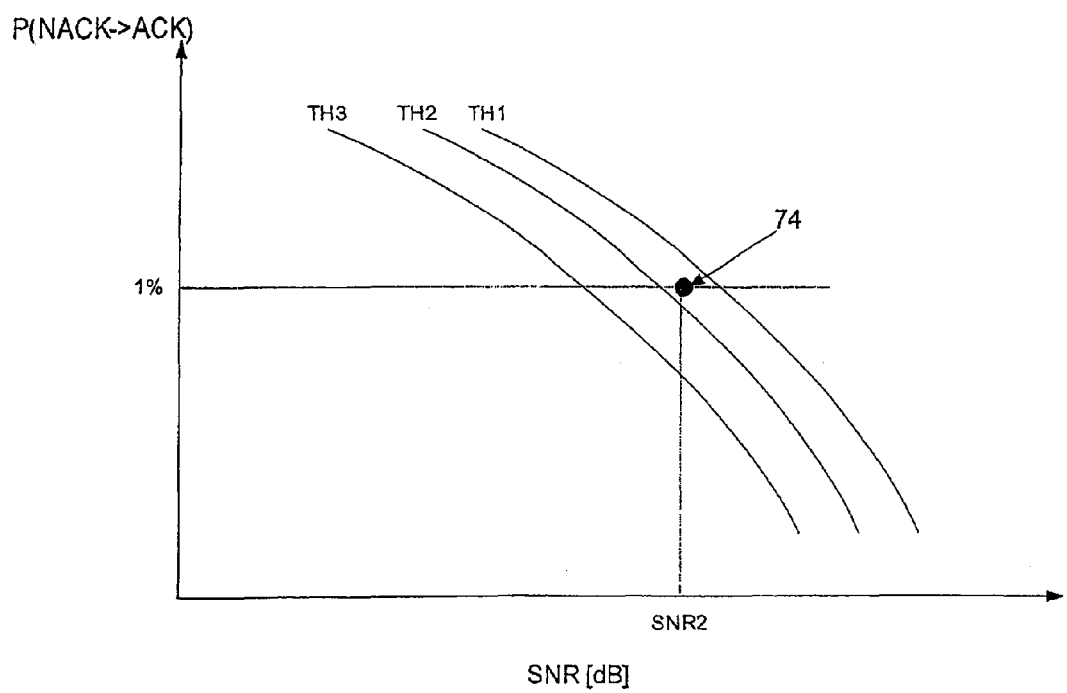
FIG. 6 is a graph of P(NACK→ACK) vs SNR for different fixed thresholds.

In the second stage, the base station 12 continuously sends a NACK to the UE 18 at a SNR having values around SNR2, and under channel conditions specified in the 3GPP specifications. Thresholds TH1, TH2 and TH3 are used and the SNR and P(NACK→ACK) results of the simulations are graphed as shown in FIG. 6. It can be seen from FIG. 6, that TH2 and TH3 meet the requirements (P(NACK→ACK)≤1% with SNR≤SNR2) and TH1 does not. The requirements are indicated by requirement point 74.

The optimal threshold is then taken as the average of these two thresholds ((TH2+TH3)/2).

For the example given above, the fixed threshold is 0.2. Therefore, for this example (using the approximate amplitude calculation) Amp×Threshold=9.65×0.2=1.93, which is less than Sum. So (Sum<Amp×Threshold) is false, indicating that the HARQ indicator is a NACK.

It is to be understood that various alterations, additions and/or modifications may be made to the parts previously described without departing from the ambit of the present invention, and that, in the light of the above teachings, the present invention may be implemented in software, firmware and/or hardware in a variety of manners as would be understood by the skilled person.

The present application may be used as a basis for priority in respect of one or more future applications, and the claims of any such future application may be directed to any one feature or combination of features that are described in the present application. Any such future application may include one or more of the following claims, which are given by way of example and are non-limiting with regard to what may be claimed in any future application.

This application is based upon and claims the benefit of priority from Australian Provisional Patent Application No. 2009901338, filed on Mar. 27, 2009, the disclosure of which is incorporated herein in its entirety by reference.

The invention claimed is:

1. A method for determining whether a hybrid automatic repeat request (HARQ) indicator received by user equipment (UE) from a base station is an acknowledgment (ACK) or negative acknowledgement (NACK), the method including the steps of:
receiving a signal representing the HARQ indicator transmitted from the base station to the UE,
determining the amplitude of a plurality of symbols encoded in the received signal,
determining a softbit for each of these symbols, each softbit being the sum of an in phase and quadrature component of the symbol,
summing the softbits, and
comparing the amplitude of the symbols to the sum of the softbits in order to determine whether the HARQ indicator is an ACK or NACK.

2. The method as claimed in claim 1, wherein the amplitude of the symbols is multiplied by a fixed threshold before being compared to the sum of the softbits.

3. The method as claimed in claim 2, wherein an ACK is indicated by the sum of the softbits being less than the amplitude of the symbols multiplied by a fixed threshold and a NACK is indicated by the sum of the softbits being equal to or greater than the amplitude of the symbols multiplied by a fixed threshold.

4. The method as claimed in claim 2, wherein the fixed threshold is determined by simulations.

5. The method as claimed in claim 1, wherein the amplitude of the symbols is calculated according to the formula:

$$Amp = \sum_{i=0}^{N-1} \left( \sqrt{I_i^2 + Q_i^2} \right)$$

where
Amp is the amplitude
N is the number of symbols
I is the in phase component of the de-scrambled signal
Q is the quadrature component of the de-scrambled signal.

6. The method as claimed in claim 1, wherein the amplitude of the symbols is calculated according to the formula:

$$Amp = \sum_{i=0}^{N-1} [\max(|I_i|, |Q_i|) + 0.5 \, \min(|I_i|, |Q_i|)]$$

where
Amp is the amplitude
N is the number of symbols
I is the in phase component of the de-scrambled signal
Q is the quadrature component of the de-scrambled signal.

7. The method as claimed in claim 1, wherein the signal is transmitted on the physical hybrid automatic repeat request indicator channel (PHICH).

8. User equipment comprising:
a receiver which receives a signal representing a hybrid automatic repeat request (HARQ) indicator; and
a processor which determines whether the HARQ indicator is an acknowledgement (ACK) or negative acknowledgment (NACK);

wherein:
the processor comprises:
a portion which determines the amplitude of a plurality of symbols encoded in the received signal;
a portion which determines a softbit for each of these symbols, each softbit being the sum of an in phase and quadrature component of the symbol,
a portion which sums the softbits, and
a portion which compares the amplitude of the symbols to the sum of the softbits in order to determine whether the HARQ indicator is an ACK or NACK.

9. The user equipment as claimed in claim 8, wherein the amplitude of the symbols is calculated according to the formula:

$$Amp = \sum_{i=0}^{N-1} \left( \sqrt{I_i^2 + Q_i^2} \right)$$

where
Amp is the amplitude
N is the number of symbols
I is the in phase component of the de-scrambled signal
Q is the quadrature component of the de-scrambled signal.

10. The user equipment as claimed in claim 8, wherein the amplitude of the symbols is calculated according to the formula:

$$Amp = \sum_{i=0}^{N-1} [\max(|I_i|, |Q_i|) + 0.5 \, \min(|I_i|, |Q_i|)]$$

where
Amp is the amplitude
N is the number of symbols
I is the in phase component of the de-scrambled signal
Q is the quadrature component of the de-scrambled signal.

* * * * *